United States Patent [19]

Howell

[11] 4,249,906

[45] Feb. 10, 1981

[54] METHOD AND APPARATUS FOR HANDLING FLUX FINES

[76] Inventor: Phillip C. Howell, 28842 Swan Island Dr., Grosse Ile Township, Wayne County, Mich. 48138

[21] Appl. No.: 104,382

[22] Filed: Dec. 17, 1979

[51] Int. Cl.[3] .......................... C21B 3/04; C22B 7/02; C22B 1/14; B01D 50/00

[52] U.S. Cl. ..................................... 23/313 R; 75/25; 75/257; 264/37; 264/109; 264/117; 266/216; 422/243; 422/291; 425/237

[58] Field of Search ..................... 23/3 B, 3 R, 313 P, 23/293 R, 293 US; 422/243, 291; 75/25, 54, 55, 257; 266/144, 216, 217, 265; 264/37, 109, 117; 425/222, DIG. 101, 237, 193, 194, 233

[56] References Cited

U.S. PATENT DOCUMENTS

| | | | |
|---|---|---|---|
| 2,277,663 | 3/1942 | Francis et al. | 75/25 |
| 3,188,195 | 6/1965 | Price | 23/313 R X |
| 3,295,952 | 1/1967 | Johnson | 425/237 UX |
| 3,649,248 | 3/1972 | Ishimitsu et al. | 23/313 R X |
| 3,770,416 | 11/1973 | Golssel | 75/25 |
| 3,773,473 | 11/1973 | Howard et al. | 23/293 R |
| 3,948,644 | 4/1976 | Maurice et al. | 75/25 |
| 4,087,254 | 5/1978 | Takewell | 23/313 R |

*Primary Examiner*—Joseph Scovronek
*Attorney, Agent, or Firm*—John W. Linkhauer

[57] ABSTRACT

A process for recovering and using fines of flux, such as limestone, used in a metallurgical process, such as oxygen steelmaking, is described. The process involves collecting fines from a receiving zone, e.g., with blower and baghouse equipment. The fines so collected are then conveyed, as by a dense-phase conveyor, to a first processing zone containing a first screening means for screening flux material which is to be fed to the process. Material not passing through said first screening means is fed to the metallurgical-process vessel, but fines passed by the first screening means are collected and formed into briquettes. The briquettes are conveyed to a second processing zone which is located above the conveyor which leads from the receiving zone to the first processing zone mentioned above. The second processing zone contains a second screening means and means for storing and releasing to the said conveyor the briquettes or portions thereof which have not passed through said second screening means. In particular, the second screening means serves to remove from the briquettes their flashings, which pass via the conveyor and the first screening means to the briquetter and are thus recycled and recovered.

9 Claims, 1 Drawing Figure

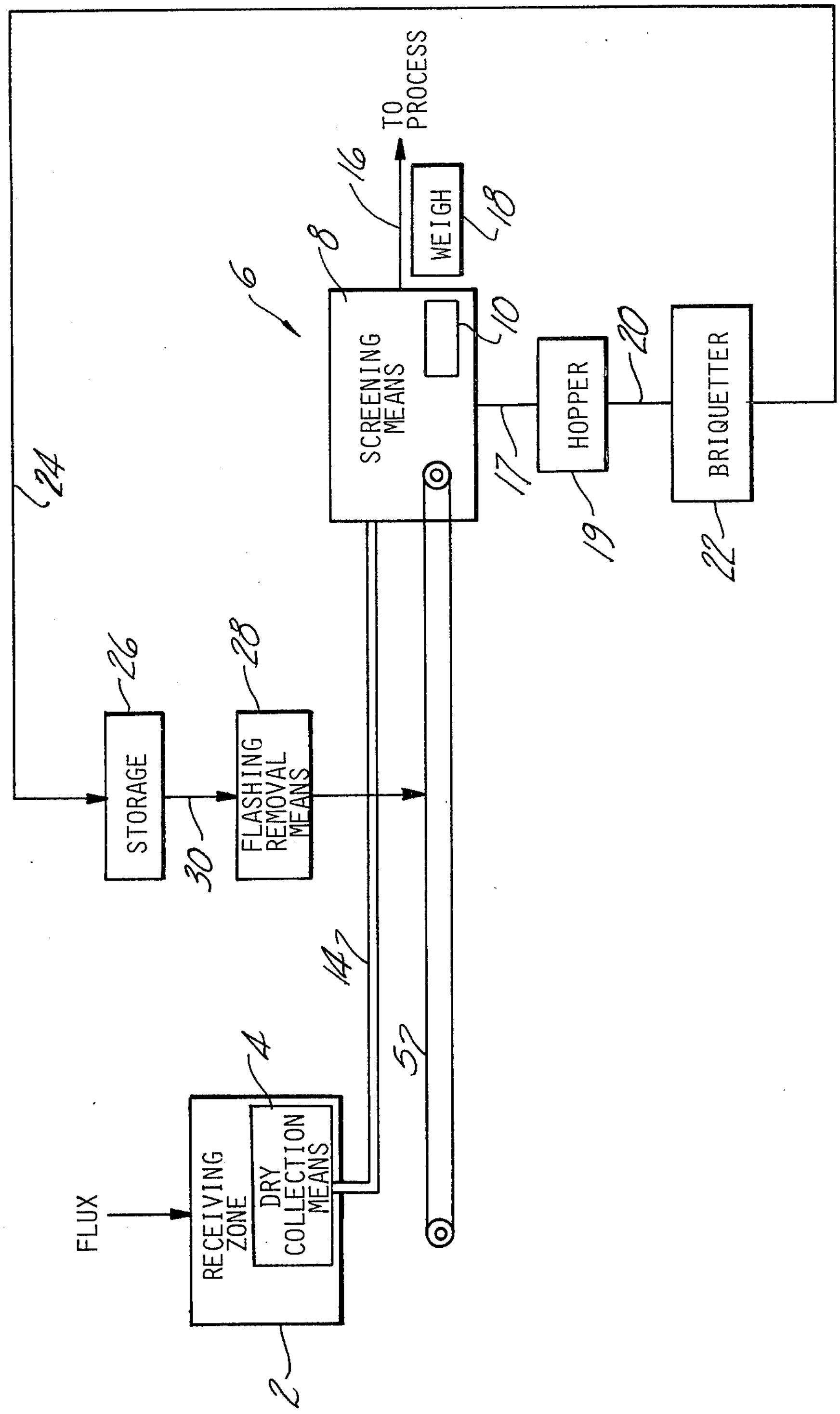
TO PROCESS
WEIGH
SCREENING MEANS
HOPPER
BRIQUETTER
STORAGE
FLASHING REMOVAL MEANS
FLUX
RECEIVING ZONE
DRY COLLECTION MEANS
2
4
6
8
10
14
16
17
18
19
20
22
24
26
28
30
52

METHOD AND APPARATUS FOR HANDLING FLUX FINES

BACKGROUND OF THE INVENTION

1. Field of the Invention

This invention relates to a method for recovering flux fines used in a metallurgical process, and to equipment used in such a process.

2. Description of the Prior Art

It is not uncommon to operate an oxygen-steelmaking vessel without any attempt to recover and use the fines contained in the limestone or other flux fed to the process. In some cases, the fines amount to less than 10 weight percent of the as-received material, the material being relatively dense and non-dusty. Such material, while desirable from the standpoint of avoiding problems of air pollution and loss of flux values, has a drawback, in that its use is associated with a need for longer blowing times per heat and a lowering of the throughput of the process. It is more usual for the as-received material to be somewhat softer and to contain a substantial proportion of fines, such as 20 to 60 weight percent.

In oxygen steelmaking, those skilled in the art know that fine flux particles do not contribute to the flux available to the bath of molten iron in the vessel. The molten iron is at a temperature such as 2900° F., and it radiates heat to the air in the vicinity of its surface at a rate such that a strong updraft is created, and only flux particles of some substantial size can pass through the updraft. Fine particles in the as-received limestone, if not incidentally lost elsewhere in the process of receiving the flux and conveying it to the vessel, are rejected into the ambient air when the fines-containing flux is fed to the vessel, for reasons indicated above.

Flux fines rejected into the air via updraft (or otherwise lost in transport) are not at all commonly recovered in any useful form. By the time that they settle, they are admixed with various other airborne impurities. Prior to the present invention, such fines have constituted a waste material, one entailing expense for clean-up of the vicinity of the process vessel and further expense for ultimate disposal (hauling and dumping). That is not all: there is further expense in connection with providing the necessary personnel-protection equipment to deal with a dust-laden working environment. Moreover, the fines sometimes work their way into, for example, the bearings of the conveyor equipment and cause shutdown because conveyor rolls seize.

Those skilled in the art have naturally considered the approach of providing the conveyors with hoods and using blowers to force the airborne fines to enter collecting equipment. This approach is not feasible because of the great expense of erecting operating and maintaining such equipment and because of the failure of such an approach to deal with the problems posed by the particles of flux which do not become airborne before they encounter the updraft created by the air in the process vessel.

Of course, the approach whereby the process vessel itself is hooded and its entire gaseous output is collected and, after processing, stored in a large, expandable vessel, is also known (see U.S. Pat. Nos. 2,829,960 and 2,855,292), but to the applicant's knowledge such a system has never reached the state of commercial feasibility.

The idea of recovering airborne fines with the use of blower means plus baghouse means is old in the art. It has not, however, been obvious to those skilled in the art of operating metallurgical-process vessels in general, and oxygen steelmaking vessels in particular, that there would be an economic benefit from the use of such means that would justify the cost of employing them. The use of such means in a flux-recovering zone to recover airborne flux particles in that zone, apart from a process which makes the recovery and use of the flux fines practical, is not an economically attractive proposition, because it solves only a part of the problem—there are other fines which are produced in the process of conveying the flux to the vessel, and there are fines which are not airborne in the receiving zone but become airborne when an attempt is made to feed them to the molten-iron-containing vessel. Attempts to remove the fines which are likely to become airborne at that time, as by screening, also are not economically attractive, because screening adds to costs and it further degrades the size of the flux particles and creates more fines and more dust.

It may be taken as known that flux particles, such as finely divided limestone, can be agglomerated by briquetting. The idea of using briquetting as a way of turning limestone fines into lumps of flux material that are useful in an oxygen steelmaking vessel or similar metallurgical process is an old one, but the practical results with many of such processes have been disappointing for various reasons. It has been found that some briquetting processes, ones which do not employ suitable conditions and procedures for the briquetting process, yield briquettes which cannot be handled or stored without undergoing degradation to an intolerable degree. There has been some question whether, considering the pressures required in order to obtain briquettes of satisfactory handling and storage characteristics, the costs of briquetting can be justified, considering the cost of the wear-resistant material needed to make the briquetting rolls and the service life that can be expected from such rolls under the operating conditions. It can, however, be taken as known, as of the time of making of the present invention, that it is physically possible to convert limestone fines in a binderless process to briquettes having tolerable storage and handling characteristics, especially if the "flashing" problem could be overcome or ignored.

Those skilled in the art of agglomeration know that every briquetting process involves to some extent a problem in that the briquette produced has, at a location corresponding to the place at which the briquetting rolls meet in the formation of the briquette, a ridge of "flashing." The flashing is relatively weak and constitutes a protuberance extending outward from the general contours of the briquette; as such, it is subject to becoming removed, for example, in handling, by contact with conveying means or other briquettes. It is desirable to have a process in which problems caused by flashing are dealt with.

Another point to be considered is the fact that briquettes made of limestone fines often do not exhibit good storage characteristics. Although such briquettes, when freshly made, can be handled with no particular difficulty, this does not continue. The briquettes tend to absorb moisture from the air and to become swollen and softened, whereupon they cannot be handled further without degrading and producing fines. This is a further reason for those skilled in the art to look away from briquetting and towards some alternative means of agglomeration.

The other equipment (dense-phase pneumatic conveyor, screen, weighing means) used with the present invention has been known per se. What has not been known or appreciated is that such equipment may usefully be combined with the other equipment discussed above to yield a working ensemble which uses briquetting and deals adequately with the flashing problem, so that relatively freshly formed flux briquettes are fed to a metallurgical process, and at a considerable savings in cost. This means that the investment in the equipment required is rapidly recovered, and the problems associated with use of a material such as soft limestone containing 20 to 60% of fines in an oxygen steelmaking furnace are overcome.

DESCRIPTION OF THE DRAWING

A satisfactory understanding of the invention may be obtaining from the foregoing and following description thereof, taken together with the appended drawing, the sole FIGURE of which is a schematic diagram of apparatus according to the invention used in practicing the method of the invention.

DESCRIPTION OF THE PREFERRED EMBODIMENTS

THE RECEIVING ZONE

In a receiving zone 2, the fines-containing limestone or other flux is accepted from the truck, railway car or other means used to convey the flux to the job site.

It will be understood by those skilled in the art that this zone and the equipment associated with it may take various forms, depending in the case of use of the invention with an existing process, upon the size and configuration of the existing equipment.

The principal concepts that are to be kept in mind with respect to the receiving zone 2 are (1) that it must be provided with a dry collection means 4, and (2) that the objective with the means 4 is to recover the part of the flux that becomes airborne in the receiving zone. No attempt is made in the receiving zone to recover substantially all of the undersize particles which would, if fed to the oxygen-steelmaking vessel or the like, be rejected there into the atmosphere. In the case of most existing installations, there is not room at the area in which the flux is first received for the installation of screening equipment of suitable size and capacity for making such a separation and thus recovering at one location all of the undersize particles which need to be removed. In existing installations, it is not uncommon for the zone 2 to comprise a cellar or excavation of somewhat limited size, containing near its bottom an end of a belt conveyor 5. In some instances, it may prove possible to install at the receiving zone screening equipment which would make such a separation possible, but there would not remain adequate room to afford access to it for repair or maintenance without expensive enlargement of the existing excavation. To avoid that, and to obtain other advantages which will become apparent from a consideration of the apparatus of the invention as a whole, it is preferred to limit the separation effort in the zone 2 to the recovery of airborne particles. Among those other advantages is the consideration that any conveying necessarily tends to generate fines, and thus it is desirable not to try to remove all the undersize particles at an upstream stage of the process.

The suitable dry collection means 4 recovers from the as-received fines the portion thereof which becomes airborne in the vicinity of the receiving zone 2, or as much of it as it is practical to recover. Such airborne fines may account for approximately 1 to 10 percent of the total of the fines which should be removed from the as-received flux in order to prevent the rejection of fines into the atmosphere at the vicinity of the metallurgical-process vessel. For this purpose, various kinds of collection means are known, including electrostatic precipitators, other precipitators, cyclones, and preferably baghouse means.

Recovery of airborne particles may be done with a dry collection means 4 in the form of a baghouse means of relatively modest capacity. The baghouse means has associated with it a blower, such as one of a capacity of approximately 1000 cubic feet per minute working at a static head of 10 to 18 inches and at a dust loading 5 to 10 grains per cubic foot, these figures being for an operation designed for a maximum unloading of 1000 tons per hour of flux. In a typical commercial operation, such unloading does not continue around the clock but rather is practiced for a maximum of about 10 hours out of 24, assuming that the oxygen steelmaking vessel or other process vessel is being operated at peak capacity, and correspondingly less if it is not. The engineering and design of the necessary equipment is well within the capabilities of those skilled in the art. The relevant factors which influence the choices to be made need to be taken into account. These include such matters as (1) the maximum proportion of fines of such size as to be capable of becoming airborne that are present in the flux material which is to be handled, (2) the physical size of the zone in which collection is to be done (i.e., considering the extent of free fall to which the flux is subjected), and (3) the size of the column of falling flux material, i.e., its cross-section. The sizing of the blower is dependent upon not only the above, but also the size, length, and configuration of the ductwork employed and the location of the blower with respect to the collector point or points and discharge point or points, but the necessary calculations are within the skill of the art.

FIRST PROCESSING ZONE

After the airborne fines have been removed from the as-received flux and collected by the means 4, the next step in the practice of the invention is the conveying of both the nonairborne material and the airborne fines to a first processing zone 6, which contains a screening means 8 and preferably also a secondary collector means 10. In the case of the non-airborne material, this is done by means of a belt conveyor 5. In the case of the airborne fines, this is done by means of a dense-phase pneumatic conveyor 14.

The screening means 8 contains a screen which separates the materials received into an oversize portion and an undersize portion. The oversize portion is conveyed as indicated at 16 to the metallurgical process vessel, such as an oxygen-steelmaking vessel. Preferably, there is associated with the means by which this conveying is done a weighing means 18.

The feeding of proper-sized particles to the process vessel, indicated in the drawing at 16, may be done either directly or indirectly, the latter being more usual. In other words, the means 16 may include usual means not shown, for directing flux material into a process vessel, such as an oxygen steelmaking vessel, including bins for the relatively short-term storage of the material and further weighing means for measuring out specific predetermined weights of material to be charged to the vessel. It is important to maintain the total interval of time between completion of briquetting and charging to the vessel suitably short, in order that the briquettes may be fed to the vessel before they have undergone substantial absorption of moisture and degradation. This usually means that such interval of time should be less than 2 days and preferably less than 24 hours.

Those skilled in the art will appreciate that a choice may be made in respect to the size of particles passed by the first screening means 8. In the case of feeding limestone to an oxygen-steelmaking vessel, satisfactory results may be obtained with a screen which retains as oversize and passes to the vessel the particles which are on the order of ¼ inch in size and larger. The screen means 8 may also be somewhat coarser than that but there is the consideration that in oxygen steelmaking, it is desirable for the flux particles to react as rapidly as possible, and thus, it is not especially desirable to use particles which are much larger than they need to be in order to be assured of passing into the vessel despite the updrafts emanating therefrom, as discussed above. The as-received flux may contain some particles which are quite large, as much as 3 inches, and these, of course, are retained as oversize by the means 8 and passed directly to the vessel as at 16.

As mentioned above, the airborne fines collected by the dry collection means 4, are conveyed to the first processing zone 6 by the dense-phase conveyor means 14. These are particles which usually are quite small, but they may include some flaky particles which are as much as ½ inch in maximum dimension. The dense-phase conveyor means is known to those skilled in the art of conveying finely divided materials; it is somewhat similar to a pneumatic conveyor, except that where in a pneumatic conveyor the matter in the conduit is mostly air and a little of solids being conveyed, in a dense-phase pneumatic conveyor, the matter in the conduit is mostly solids and a little air, the solids being in a suspended state similar to that of finely divided solids in a fluidized bed. Those skilled in the art will appreciate that it is somewhat unusual for a dense-phase pneumatic conveyor to terminate into something other than a closed receptacle, but in accordance with the present invention, the means 14 terminates either above the first screening means 8 or just below the means 8 and above the hopper 19, but in any event in the vicinity of the secondary collection means 10. The screening operation conducted in the first processing zone 6 necessarily itself generates a certain proportion of airborne fines, and it will also in most cases, not be possible to prevent some of the airborne fines conveyed by the dense-phase pneumatic conveyor 14 from again becoming airborne when they are received at the delivery end of the conveyor 14. The secondary collection means 10 may take the form of a small bag-type dust collector of approximately 2500 cubic feet per minute capacity, in the case of an operation on the scale indicated above. With reference again to such an operation, the dense-phase pneumatic conveyor may be one that is adapted to convey lime dust having a density of 50 pounds per cubic foot at greater than 840 pounds per hour a distance of approximately 600 feet using a Schedule 40 pipe of 1½ inch diameter and 30 to 40 standard cubic feet per minute of air at 65 to 70 pounds per square inch gauge. Dense-phase conveying equipment of the kind used in accordance with the present invention is commercially available from various suppliers, e.g., Consolidated Engineering, Chicago, Illinois.

HOPPER, BRIQUETTING, AND STORAGE

Undersize material passing through the screen means 8 passes as at 17 to a hopper 19. Material passes as indicated at 20 from the hopper 19 to a briquetter 22. Suitable equipment and practices for the binderless briquetting of flux fines such as limestone fines are well known to those skilled in the art. Material is forced, as by a screw conveyor or the like (controllable-pressure, positive-displacement means) into the nip of briquetting rolls, which are also provided with a controllable force to balance the roll-separating force of the briquetting operation. Typical conditions in the briquetting of 12 to 13 tons per hour of lime fines include using rolls of 20½ inch diameter operating at 20 to 40 revolutions per minute to make pillow-shaped briquettes of approximately 6 cubic centimeters each. The roll-separating force is approximately 15 tons per inch of roll length. The precise briquetting conditions to be employed will vary in accordance with the characteristics of the particular lime or other flux material being processed, and it is within the skill of an operator of briquetting equipment to make any necessary adjustments in the process parameters to obtain satisfactory briquettes.

After being made, the briquettes are passed as indicated at 24 to storage means 26. Desirably, the storage means is of approximately such capacity as to contain enough briquettes to operate the process vessel for a period of time on the order of 2 to 24 hours. Owing to the nature of binderless briquetted fines of limestone, i.e., that they tend to absorb moisture from the air and swell and become degraded, it is essential to plan upon using such briquettes rather promptly after they are produced, preferably within less than 24 hours and nearly always within less than 48 hours. With such fines, it is ordinarily not economical either to provide the storage means with a controlled moisture-free atmosphere or to coat the briquettes with material for making the briquettes moisture-resistant, especially since merely by the prompt use of the briquette these measures adding to the cost of the process can be avoided. Those skilled in the art will recognize that the practices in respect to storage may be modified in various ways if the flux being handled is a different one, such as fluorspar.

FLASH-REMOVAL MEANS

Desirably, but not necessarily, the apparatus of the invention further comprises a flashing-removal means 28, to which briquettes are passed from storage as indicated at 30. Preferably, the means 28 is located over the conveyor 5. Desirably, the means 28 is included in the apparatus of the invention in order to deal with the problem of insuring the removal of flashing from the briquettes. The means 28 may be any means which provide to the briquettes an action which causes them to be rubbed one against another in order that flashings contained thereon may be removed. The means 28 preferably comprises a vibrating screen, both the undersize and oversize outputs of which are fed to the conveyor 5. Deflashing is obtained not only as a result of such means, if used, but also as a result of abrasion occurring as briquettes are removed from the briquetting means, during transport to storage, during storage as particles pass through the storage bin, and further during discharge from storage in passing to the conveyor 5. Any fines produced as a result of such deflashing are, of course, removed by the screening means 8 as undersized from the product passing to the process vessel as at 20.

It will be appreciated that at some times, the conveyor 5 is operated to feed as-received material from zone 2 to zone 6, and at other times (when no flux is being fed to zone 2) the conveyor 5 is operated to convey briquettes to the zone 6. By operating the weighing means 18 and observing the weights sensed by it during the times of operation in two different modes of operating the conveyor as discussed above, it is possible to learn how much of the total flux which is fed to the process is material which has been subjected to processing (fines removal, briquetting, and possibly flashing removal) in accordance with the invention.

Alternatively, it is possible to operate by weighing means 18 only when briquetted material is being passed to the process vessel. Of course, the exact location of the weighing means with respect to the remainder of the apparatus may be varied to suit the requirements of a particular installation. If information generated by use of the weighing means is not required, this feature may be eliminated.

The apparatus and process as described above improve productivity and yield considerable economic benefits. The benefits are of such magnitude that the solving of the problems of clean-up and conveyor-belt breakage is essentially free of charge. There is also avoided the damage from a dusty atmosphere to other mechanical, electrical or hydraulic equipment. The economic value of the fines in their briquetted form, as a replacement for a part of the as-received fines-containing flux which would otherwise necessarily have been purchased in order to operate the process is great enough by itself to justify installing and operating a system according to the invention.

Although the invention has been discussed hereinabove principally with reference to the handling of fines of calcined limestone, those skilled in the art will appreciate that the invention is applicable to the handling of various other flux or coolant materials such as raw lime, dolomitic lime, dolomite, fluorspar, and ore.

While I have shown and described herein a certain embodiment of my invention, I intend to cover as well any change or modification therein which can be made without departing from its spirit and scope.

I claim:

1. Apparatus for processing flux material at a site whereat said material is received and is fed to a metallurgical-process vessel, said material containing in its form as received at said site a portion of fine particles of such size as to be rejected to the atmosphere at said process vessel, said apparatus comprising a receiving zone having therein a first dry collection means for removing from said as-received material a portion thereof which becomes airborne in said receiving zone, a screening means serving to separate material fed thereonto into an oversize portion and an undersize portion means for removing non-airborne particles of said flux material from said receiving zone and conveying said non-airborne particles onto said screening means, hopper means for receiving said undersize portion, dense-phase pneumatic conveyor means for conveying to said hopper means material obtained from said first dry collection means, briquetting means for receiving material from said hopper means and producing briquetted particles in pieces of such size as to be classified by said screening means into said oversize portion of said material fed thereon, means conveying said briquetted particles to said screening means, and means conveying said oversize portion from said screening means to said process vessel.

2. Apparatus for processing flux material at a site whereat said material is received and is fed to a metallurgical-process vessel, said material containing in its form as received at said site a portion of fine particles of such size as to be rejected to the atmosphere at said process vessel, said apparatus comprising a receiving zone having therein a first dry collection means for removing from said as-received material a portion thereof which becomes airborne in said receiving zone, a screening means serving to separate material fed thereonto into an oversize portion and an undersize portion, means for removing non-airborne particles of said flux material from said receiving zone and conveying said non-airborne particles onto said screening means, hopper means for receiving said undersize portion, dense-phase pneumatic conveyor means for conveying to said hopper means material obtained from said first dry collection means, a second dry collection means located in the vicinity of said screening means and a discharge end of said dense-phase pneumatic conveyor means for recovering airborne particles in said vicinity and feeding them to said hopper means, briquetting means for receiving material from said hopper means and producing briquetted particles in pieces of said size as to be classified by said screening means into said oversize portion of said material fed thereon, means conveying said briquetted particles to said screening means, and means conveying said oversize portion from said screening means to said process vessel.

3. Apparatus as defined in claim 2, said apparatus further comprising weighing means operatively associated with said means conveying said oversize portion to said process vessel.

4. Apparatus as defined in claim 2, wherein said means conveying said briquetted particles to said screening means comprises means for causing said pieces to be abraded against one another to remove flashings on said pieces and to be deposited upon said means for conveying non-airborne particles onto said screening means.

5. Apparatus as defined in claim 4, said apparatus further comprising weighing means operatively associated with said means conveying said oversize portion to said process vessel.

6. A method for handling limestone containing fines and delivering it to a metallurgical-process vessel, comprising separating and collecting an airborne portion of said fines at a receiving station, conveying the remainder of said limestone including a nonairborne-fines portion to a screening means via a belt conveyor, screening said limestone to recover an oversize portion suitable for direct feeding to said vessel and an undersize portion, briquetting said undersize portion in the absence of binder to form briquettes of minimum dimensions corresponding to that of said oversize portion, and feeding said briquettes to said vessel before they have undergone substantial absorption of moisture and degradation.

7. A method as defined in claim 6, said method comprising the additional step of separating and collecting airborne fines at the vicinity of said screening means and adding them to said undersize portion.

8. A method as defined in claim 6, said method comprising the additional step of conveying from said receiving station to the vicinity of said screening means by dense-phase pneumatic conveyor means said airborne portion of said fines.

9. A method as defined in claim 8, said method comprising the additional step of separating and collecting airborne fines at the vicinity of said screening means and adding them to said undersize portion.

* * * * *